(12) United States Patent
Gschwind et al.

(10) Patent No.: US 7,287,247 B2
(45) Date of Patent: Oct. 23, 2007

(54) INSTRUMENTING A SOFTWARE APPLICATION THAT INCLUDES DISTRIBUTED OBJECT TECHNOLOGY

(75) Inventors: Thomas Gschwind, Vienna (AT); Pankaj Garg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 10/293,626

(22) Filed: Nov. 12, 2002

(65) Prior Publication Data

US 2004/0093588 A1    May 13, 2004

(51) Int. Cl.
*G06F 9/44* (2006.01)
(52) U.S. Cl. ..................... 717/130
(58) Field of Classification Search ................ 717/130, 717/158
See application file for complete search history.

(56) References Cited

U.S. PATENT DOCUMENTS

| | | | |
|---|---|---|---|
| 6,072,953 A * | 6/2000 | Cohen et al. ............... | 717/166 |
| 6,298,475 B1 * | 10/2001 | Alcorn ....................... | 717/118 |
| 6,826,716 B2 * | 11/2004 | Mason ......................... | 714/38 |
| 2002/0049963 A1 * | 4/2002 | Beck et al. ................ | 717/130 |
| 2002/0133807 A1 * | 9/2002 | Sluiman ..................... | 717/124 |

OTHER PUBLICATIONS

"ATOM: a system for building customized program analysis tools", Amitabh Srivastava, Alan Eustace, Conference on Programming Language Design and Implementation archive, 1994, pp. 196-205, ISBN:0-89791-662-X.*

* cited by examiner

*Primary Examiner*—Wei Zhen
*Assistant Examiner*—Philip Wang

(57) ABSTRACT

A method for instrumenting a compiled software application that includes distributed object technology. The method includes deriving an interface and class of an object of the compiled software application. Additionally, the interface is reconstructed to enable a client to communicate with the object once the object includes an instrumented function to measure the performance of the object. Furthermore, the object is implemented with the instrumented function. The compiled software application is enabled to utilize the object that includes the instrumented function.

20 Claims, 9 Drawing Sheets

Class Name Changer Module

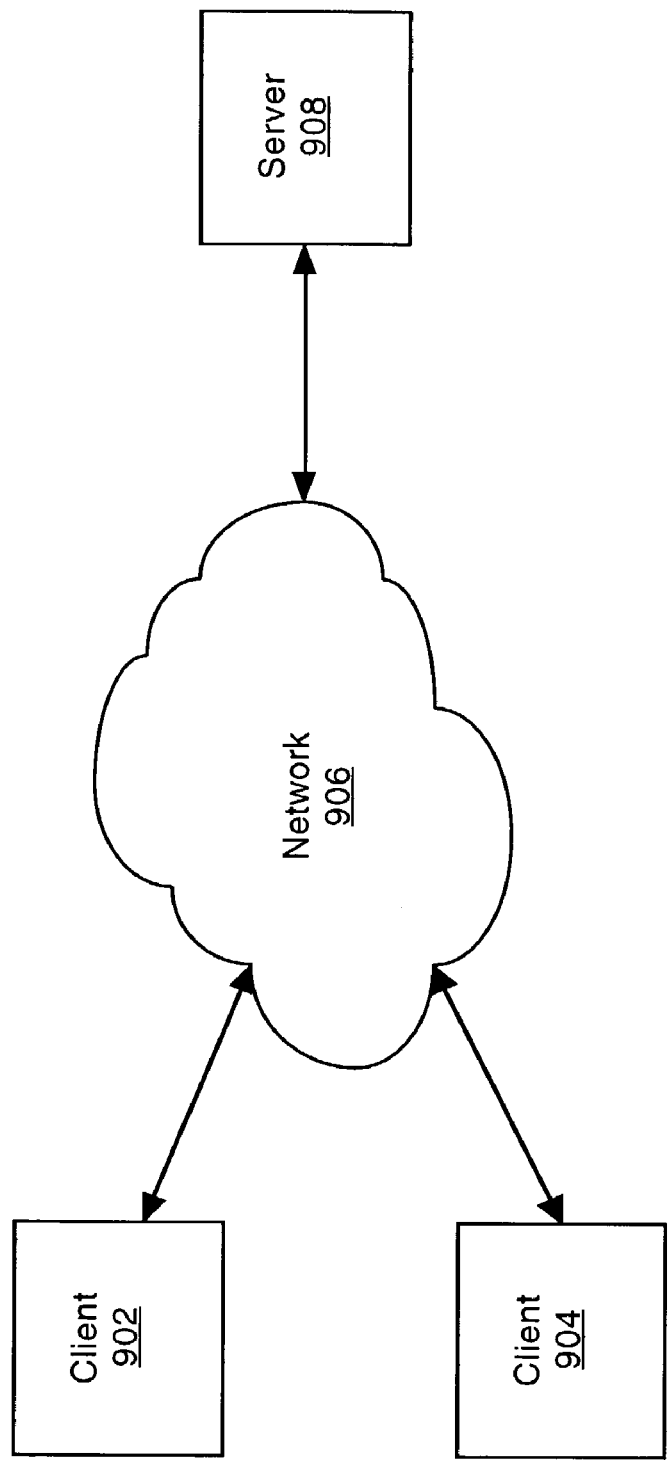

INSTRUMENTING A SOFTWARE APPLICATION THAT INCLUDES DISTRIBUTED OBJECT TECHNOLOGY

BACKGROUND ART

Computers have become integral tools used in a wide variety of different applications, such as in finance and commercial transactions, computer-aided design and manufacturing, health care, telecommunication, education, etc. Computers are finding new applications as a result of advances in hardware technology and rapid development in software technology. Furthermore, the functionality of a computer system is dramatically enhanced by coupling these types of stand-alone devices together in order to form a networking environment. Within a networking environment, users may readily exchange files, share information stored on a common database, pool resources, and communicate via electronic mail (e-mail) and video teleconferencing. Furthermore, computers which are coupled to a networking environment like the Internet provide their users access to data and information from all over the world.

The software applications that operate on computer systems may be implemented in many different ways. For example, a programming language such as the Java™ 2 Platform, Enterprise Edition (J2EE™) developed by Sun Microsystems may be utilized in order to create useable software applications. Within J2EE there are distributed objects which are referred to as Enterprise JavaBeans™ (EJB™). It should be appreciated that a software application can include multiple Enterprise JavaBeans. As such, as part of a transaction, one Enterprise JavaBean (or distributed object) of a software application can invoke or call another Enterprise JavaBean within the same or another application. Furthermore, the called Enterprise JavaBean (or object) can then call or invoke a third Enterprise JavaBean and so on: Additionally, the third Enterprise JavaBean may subsequently return a value to the second Enterprise JavaBean. Consequently, the second Enterprise JavaBean may then do some computations with the received value in order to provide a value to the first Enterprise JavaBean. It should be understood that this transaction may have been initiated by a call issued by a client computer to the software application operating on a server.

There are those individuals and/or companies who are interested in improving or optimizing the performance of software applications. For example, by understanding where the most time is being spent during a transaction of a software application, a determination may be made of how to optimize or improve the transaction. Therefore, efforts are made to determine the elapsed time it takes to complete a software transaction along with determining how much time each distributed object of the transaction takes. In this manner, the object(s) that takes the most amount of time may be targeted for optimization. However, there are obstacles associated with measuring the completion time of each distributed object of a software transaction.

For example, one of the obstacles is that the source code of a software application may not be available to the company and/or individual trying to evaluate the performance of the application objects. Instead, the evaluating company and/or individual has access to the compiled version of the application. As such, the typical solution in this situation is to utilize proxy objects (or monitor objects) that work with the compiled software application. Specifically, for each object of a desired transaction, a proxy object is created that is associated with that object of the compiled application. The desired function of each proxy object is to measure the amount of time spent by its corresponding object during the transaction.

Specifically, a call to an object first goes through the proxy object before going to the desired object. So when a client makes a call to a transaction operating on a server, the call first goes through a proxy object associated with the first object of the transaction. Additionally, when the first object makes a call to a second object of the transaction, the call passes through the proxy object associated with the second object. As such, the proxy object provides some type of time measurement associated with the object of the transaction.

Depending on the software application, there are different choices for the implementation of such proxy objects. For example, the software application itself provides support for being instrumented. In this case, the proxy object may be registered with the software application and is executed within the application process. Alternatively, the software application itself provides no support for being instrumented. In this case, proxies being used to intercept the communication between distributed objects usually involves another computer program and increases the communication overhead.

However, there are disadvantages associated with both proxy object solutions. For example, one of the disadvantages associated with the first solution is that most applications do not support this approach. Hence, this first solution typically cannot be used with most applications. Another disadvantage associated with the first solution is that it usually involves coming up with a different solution for each application since each application commonly provides a different programmer's interface, e.g., API (application programming interface).

One of the disadvantages associated with the second solution is that it involves another computer program that intercepts the communication and forwards it to the subsequent object. Therefore, it introduces one more level of processing thereby adversely affecting the accuracy of the time measurements. In other words, the measurements of the elapsed time of each object within a transaction are offset by the overhead introduction by the proxy objects.

Another disadvantage associated with the second solution is that the protocol used by the client and server to exchange messages usually needs to be well understood by those desiring to measure the performance of the software application. Otherwise, it can be very difficult to implement the proxy object solution.

Accordingly, a need exists for a way to more accurately measure the amount of time spent by a distributed object during a transaction when the source code of a software application is not available and if the application does not support the registration of proxy objects to be executed within the application. A further need exists for a way that satisfies the above mentioned need and can be implemented even if the client/server protocol for exchanging messages is not well understood.

DISCLOSURE OF THE INVENTION

A method for instrumenting a compiled software application that includes distributed object technology. The method includes deriving an interface and class of an object of the compiled software application. Additionally, the interface is reconstructed to enable a client to communicate with the object once the object includes an instrumented function to measure the performance of the object. Furthermore, the object is implemented with the instrumented function. The compiled software application is enabled to utilize the object that includes the instrumented function.

BRIEF DESCRIPTION OF THE DRAWINGS

FIG. 9 is a block diagram of an exemplary network that may be utilized in accordance with an embodiment of the present invention.

MODE(S) FOR CARRYING OUT THE INVENTION

Figure 1:
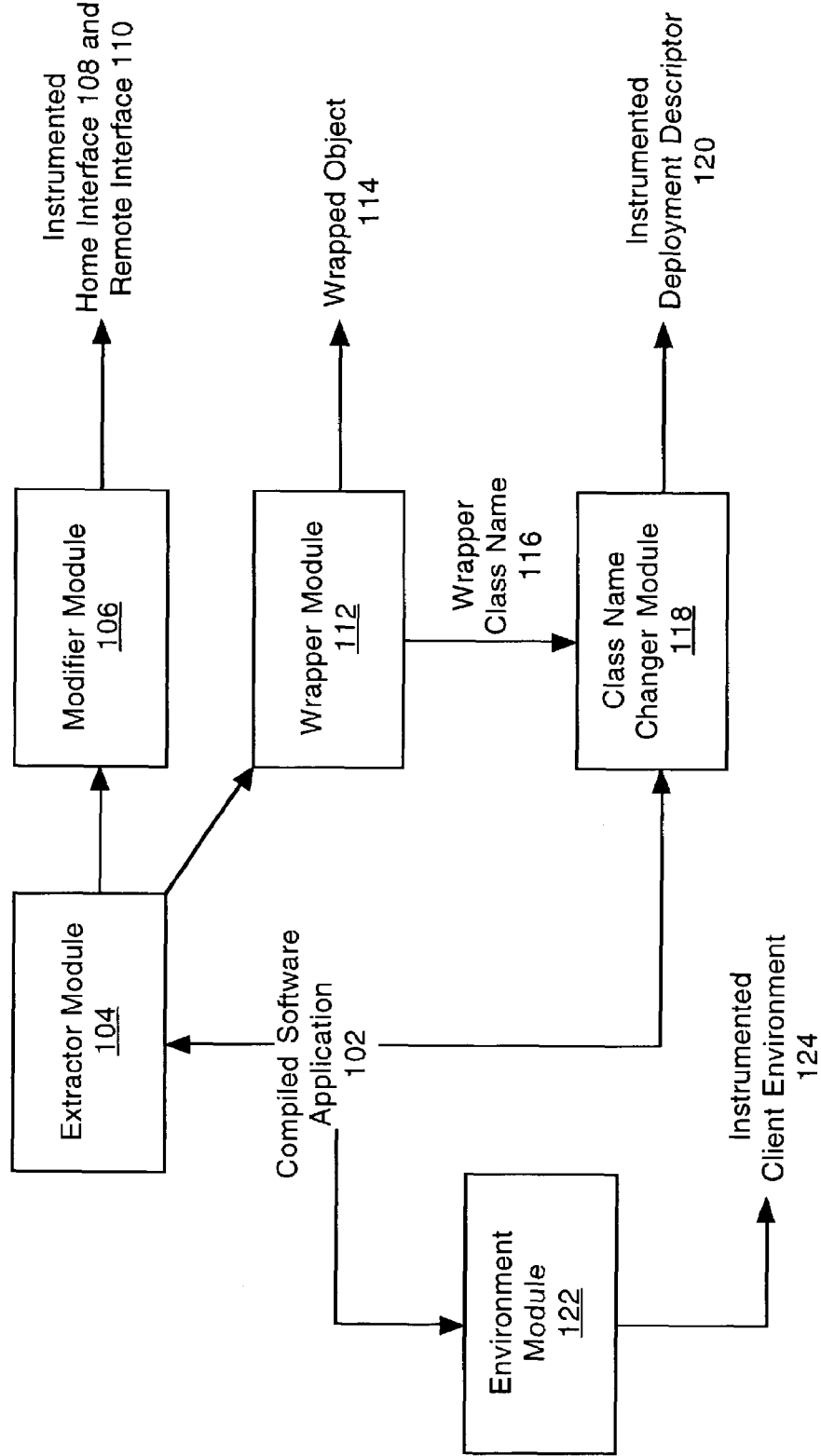
FIG. 1 is a block diagram of an automated dynamic interface adaptation system in accordance with an embodiment of the present invention.

FIG. 1 is a block diagram of an automated dynamic interface adaptation system 100 in accordance with an embodiment of the present invention for implementing management instrumentation within compiled software applications (e.g., 102) that include distributed object technology. For example, the automated dynamic interface adaptation system 100 may be utilized with distributed object technologies such as, but is not limited to, the Microsoft®.NET programming language and the Java™ 2 Platform, Enterprise Edition (J2EE™) developed by Sun Microsystems. The management instrumentation implemented by the automated dynamic interface adaptation system 100 may be utilized for, but is not limited to, measuring the amount of time spent by a distributed object during a transaction of the compiled software application (e.g., 102). In one embodiment, the automated dynamic interface adaptation system 100 may be a software system implemented in a computer system. Alternatively, the automated dynamic interface adaptation system 100 may be implemented by hardware or by any combination of hardware and software.

It is understood that the computer system that may embody the automated dynamic interface adaptation system 100 may be any kind of computer system. For example, the computer system may be, but is not limited to, a main-frame computer system, a super computer system, a server computer system, a workstation computer system, a personal computer system or a portable computer system.

Specifically, the automated dynamic interface adaptation system 100 is able to take a compiled software application 102 that includes distributed object technology and automatically determine where to insert instrumentation within it without having access to its source code. This is beneficial because it enables companies and/or individuals to evaluate more easily and more accurately the performance of a software application that includes distributed object technology when its source code is unavailable.

The automated dynamic interface adaptation system 100 includes an extractor module 104 that is coupled to receive the compiled software application 102. The extractor module 104 is able to derive the home and remote interfaces and the class implementing a distributed object from the compiled application 102. Within one embodiment, if the distributed object was an Enterprise JavaBean™ (EJB) of the J2EE, the extractor module 104 may utilize the deployment descriptor provided for each Enterprise JavaBean to derive the names of the classes implementing the home interface, the remote interface, and the class implementing that Enterprise JavaBean. The classes themselves are subsequently derived from the compiled software application 102. Once derived, the extractor module 104 passes the home and remote interfaces to a modifier module 106 and the distributed object's implementation class to a wrapper module 112. Both the modifier module 106 and the wrapper module 112 are coupled to the extractor module 104.

The modifier module 106 of FIG. 1 receives the home and remote interfaces and implementation class from the extractor module 104 and subsequently reconstructs the interfaces in order to produce an instrumented home interface 108 and an instrumented remote interface 110. In this manner, the instrumented home interface 108 and remote interface 110 may be substituted for the original home and remote interfaces of the distributed object of software application 102. Within one embodiment, the instrumented home interface 108 and remote interface 110 include new functionality that allow client devices to pass additional information related to the instrumentation to a server that has the compiled application 102 operating on it. The modifier module 106 may reconstruct the received home and remote interfaces to become instrumented in different ways in accordance with the present embodiment. For example, within J2EE, the process of Java reflection may be utilized to reconstruct the received home and remote interfaces into an instrumented home interface 108 and an instrumented remote interface 110.

The automated dynamic interface adaptation system 100 also includes the wrapper module 112 that is coupled to receive the distributed object's implementation class from the extractor module 104. Upon reception, the wrapper module 112 wraps the distributed object implementation in a wrapper to enable the software application 102 to utilize the instrumentation in conjunction with the distributed object. Subsequently, the wrapper module 112 produces a wrapped distributed object 114. Additionally, the wrapper module 112 is coupled to a class name changer module 118. As such, the wrapper module 112 outputs the wrapper class name 116 associated with the wrapped distributed object 114 to the class name changer module 118. It is understood that the wrapper provided by wrapper module 112 may be implemented in a wide variety of ways in accordance with the present embodiment. For example, an Enterprise JavaBean may be wrapped in a wrapper by the wrapper module 112 in order to include the desired instrumentation and also to be able to access the additional information passed to the server by clients for implementation of the instrumentation.

Within FIG. 1, the class name changer module 118 receives the wrapper class name 116 from the wrapper module 112 and is also coupled to receive the deployment descriptor associated with the distributed object from the application 102. Consequently, the class name changer module 118 replaces the original class name located within the distributed object's deployment descriptor with wrapper class name 116 associated with the wrapped object 114. As such, the class name changer module 118 produces an instrumented deployment descriptor 120 associated with the distributed object. It is appreciated that the functionality performed by the class name changer module 118 may be implemented in diverse ways in accordance with the present embodiment. For example, when operating with the J2EE, the class name changer module 118 may replace the original Enterprise JavaBean class name in its deployment descriptor with the wrapper class name 116 of the wrapper utilized to create the wrapped object 114.

The automated dynamic interface adaptation system 100 also includes an environment module 122 that is coupled to receive portion(s) of the compiled software application 102 in order to instrument the environment that a client executes within. It is noted that the environment module 122 may instrument the environment that the client executes within in different ways. For example, within J2EE, the dynamic interface adapter may instrument the javax.rmi.PortableRemoteObject.narrow function to return an adapter that adapts each non instrumented Enterprise JavaBean function in the remote interface to its instrumented counterpart and may pass additional information to the Enterprise JavaBean executed on the server. It is noted that this technique is described in more detail with reference to FIG. 6.

Alternatively, the environment module 122 of FIG. 1 may instrument the environment that the client operates within in another way. For example, within J2EE, the lookup functions of the Enterprise JavaBean client-side support libraries may be instrumented by the environment module 122 by returning an adapter in a manner similar to that previously described herein.

Figure 2:
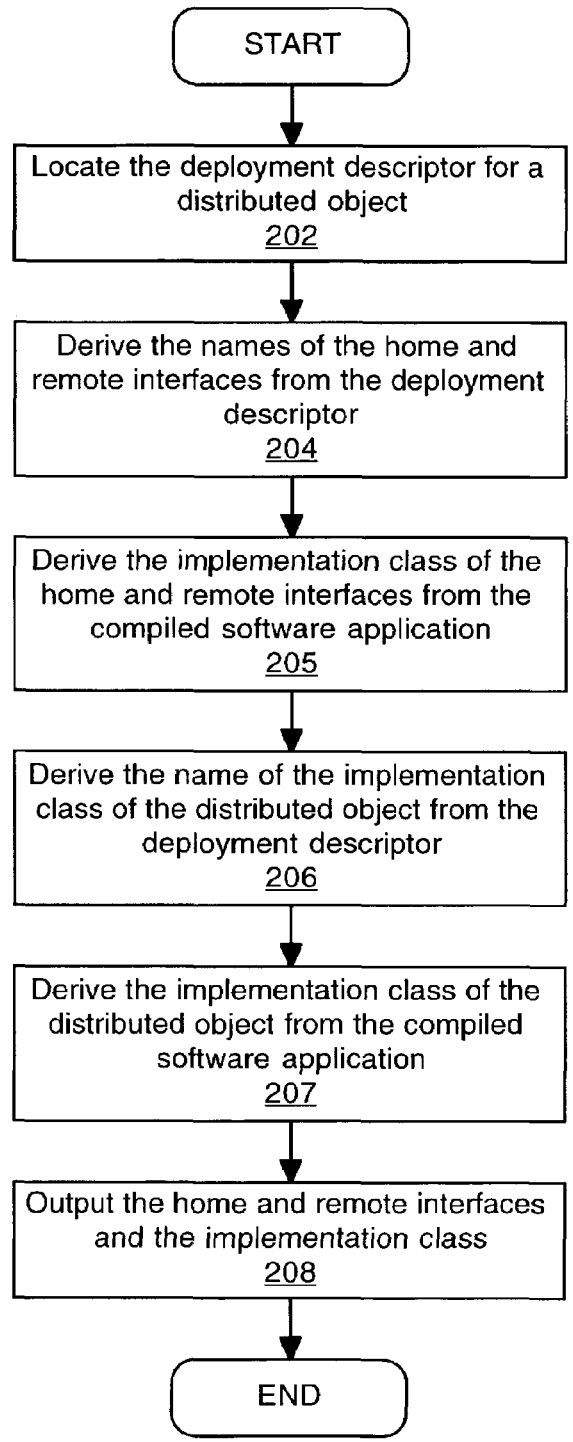
FIG. 2 is a flowchart of steps performed by the extractor module of FIG. 1 in accordance with an embodiment of the present invention.

FIG. 2 is a flowchart 200 of steps performed by the extractor module 104 of FIG. 1 in accordance with an embodiment of the present invention. Although specific steps are disclosed in flowchart 200, such steps are exemplary. That is, the extractor module 104 is well suited to performing various other steps or variations of the steps recited in FIG. 2. It should be appreciated that the steps of flowchart 200 may be performed by software, by hardware or by any combination of software and hardware.

At step 202, the extractor module 104 is coupled to receive the compiled software application 102 and consequently it locates the deployment descriptor associated with a desired distributed object of application 102. It is understood that the deployment descriptor associated with the desired distributed object may be implemented in a wide variety of ways in accordance with the present embodiment. For example, the deployment descriptor may be implemented as an extensible Markup Language (XML) file as implemented within the Java 2 Platform, Enterprise Edition (J2EE).

In step 204 of FIG. 2, the extractor module 104 derives the names of the classes implementing the home and remote interfaces from the software application whose names are derived from the deployment descriptor associated with the desired distributed object. Subsequently, in step 205, the classes implementing the home and remote interfaces are derived from the compiled software application. It is understood that the home and remote interfaces are what the distributed object exposes to clients thereby enabling them to utilize the distributed object. The home and remote interfaces may be implemented in diverse ways in accordance with the present embodiment. For example, the following code illustrates an exemplary home interface for an Enterprise JavaBean. It is understood that this home interface code is provided as an example.

```
interface WeatherHome
    extends EJBHome {
        Weather create( )
        throws javax.ejb.CreateException,
            java.rmi.RemoteException;
}
```

The following code illustrates an exemplary remote interface for an Enterprise JavaBean. It is appreciated that this remote interface code is provided as an example.

```
interface Weather
    extends EJBobject {
        int getTemp(String city)
        throws java.rmi.RemoteException;
}
```

At step 206 of FIG. 2, the extractor module 104 derives the name of the implementation class of the distributed object from its deployment descriptor. Subsequently, in step 207, the implementation class itself can be derived from the compiled software application 102. It is appreciated that within the present embodiment, the extractor module 104 is well suited to perform steps 204, 205 206 and 207 in an order different than the order shown within FIG. 2, as long as step 204 is executed before step 205 and step 206 is executed before step 207. In step 208, the extractor module 104 outputs the extracted home and remote interfaces of the desired distributed object to the modifier module 106 and the distributed object's implementation class to the wrapper module 112. At the completion of step 208, the extractor module 104 exits flowchart 200.

Figure 3:
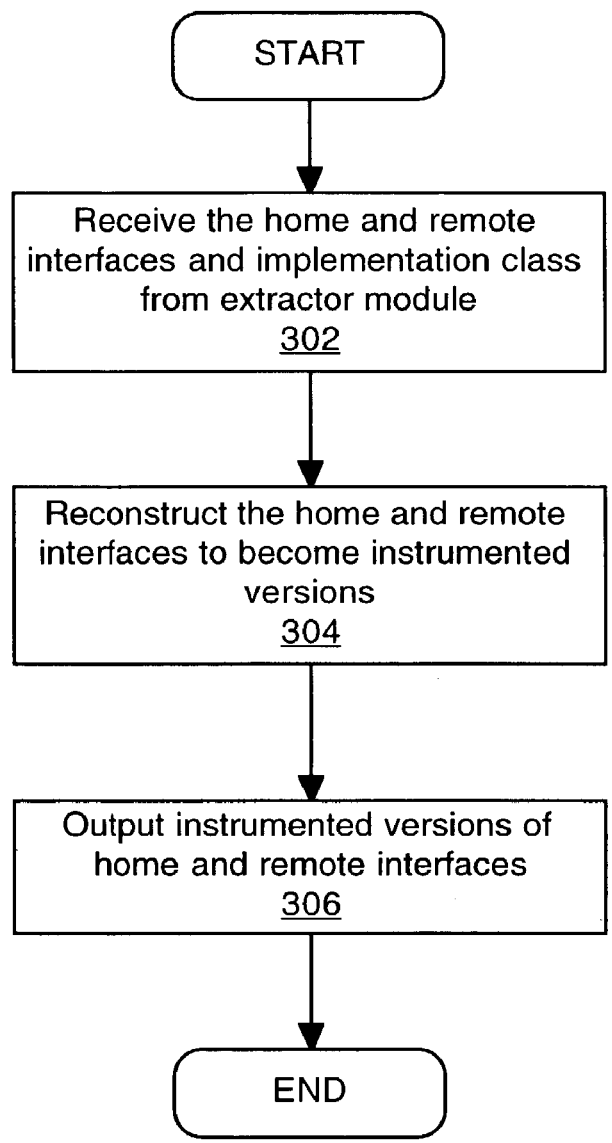
FIG. 3 is a flowchart of steps performed by the modifier module of FIG. 1 in accordance with an embodiment of the present invention.

FIG. 3 is a flowchart 300 of steps performed by the modifier module 106 of FIG. 1 in accordance with an embodiment of the present invention. Although specific steps are disclosed in flowchart 300, such steps are exemplary. That is, the modifier module 106 is well suited to performing various other steps or variations of the steps recited in FIG. 3. It should be understood that the steps of flowchart 300 may be performed by software, by hardware or by any combination of software and hardware.

In step 302, the modifier module 106 receives the home interface, remote interface and the implementing class of the desired distributed object from the extractor module 104. It is understood that the modifier module 106 may be coupled to the extractor module 104 as shown in FIG. 1.

At step 304 of FIG. 3, the modifier module 106 reconstructs the home and remote interfaces of the distributed object in order to generate instrumented versions of the home and remote interfaces (e.g., 108 and 110, respectively). It is understood that the instrumented home interface 108 and remote interface 110 produced at step 304 may include new functionality that allows client devices to pass additional information associated with instrumentation functionality to the compiled application 102 operating on a server. At step 304, the modifier module 106 may reconstruct the received home and remote interfaces in diverse ways in order to produce the instrumented home and remote interfaces in accordance with the present embodiment. For example, Java reflection may be utilized within J2EE to reconstruct the received home and remote interfaces into instrumented home interface 108 and instrumented remote interface 110.

The following code illustrates an exemplary instrumented version of a home interface for an Enterprise JavaBean that may be produced by the modifier module 106. The exemplary code illustrates how the modifier module 106 may modify the home interface code (shown herein with reference to FIG. 2) to produce an instrumented home interface (e.g., 108). Specifically, the modifier module 106 at step 304 may instrument the home interface by extending an interface whose purpose is to indicate that the home interface has been instrumented. The following exemplary code illustrates an "Instrumented" home interface.

```
interface WeatherHome
    extends Instrumented, EJBHome {
        Weather create( )
            throws javax.ejb.CreateException,
                java.rmi.RemoteException;
    }
```

Furthermore, the following code illustrates an exemplary instrumented version of the remote interface of an Enterprise JavaBean that may be produced by the modifier module 106. The exemplary code illustrates how the modifier module 106 may alter the remote interface code (shown herein with reference to FIG. 2) to produce an instrumented remote interface (e.g., 110). Specifically, the modifier module 106 at step 304 may instrument the remote interface by extending an interface whose purpose is to indicate that the remote interface has been instrumented along with inserting additional functionality that allows a client to pass additional parameters to the distributed object as shown below.

```
interface Weather
    extends Instrumented, EJBobject {
        int getTemp(String city)
            throws java.rmi.RemoteException;
        int getTemp(Info info,
            String city)
            throws java.rmi.RemoteException;
    }
```

In step 306 of FIG. 3, the modifier module 106 outputs the instrumented home interface 108 and the instrumented remote interface 110 that may subsequently be utilized to assist in measuring the performance of the distributed object of compiled application 102. At the completion of step 306, the modifier module 106 exits flowchart 300.

Figure 4:
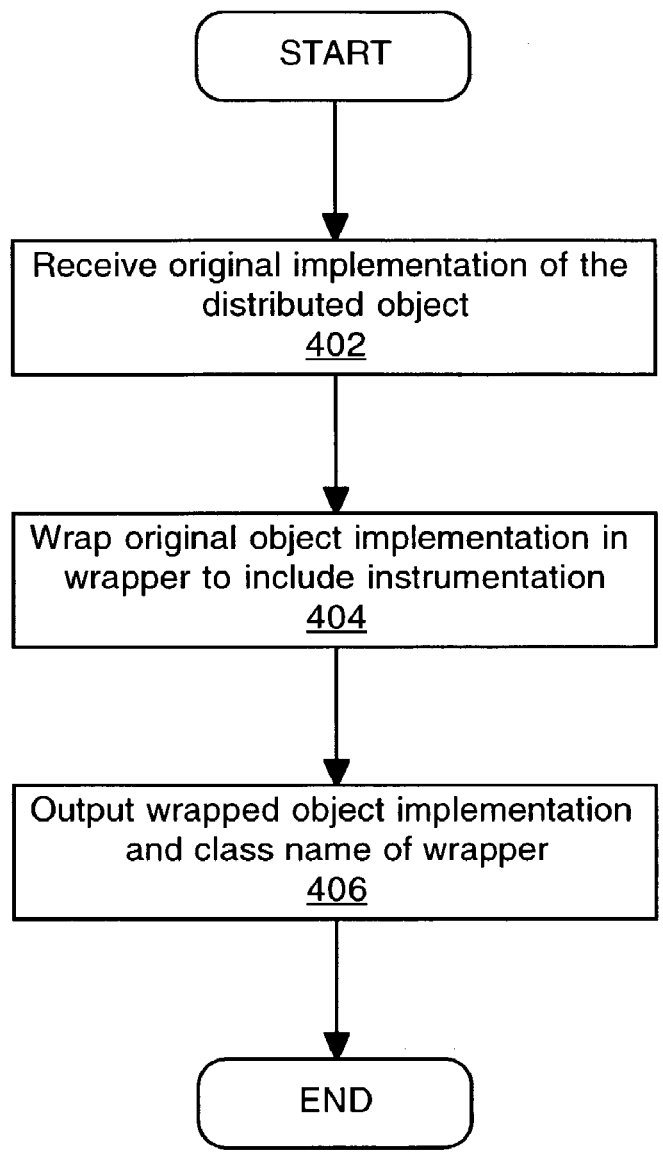
FIG. 4 is a flowchart of steps performed by the wrapper module of FIG. 1 in accordance with an embodiment of the present invention.

FIG. 4 is a flowchart 400 of steps performed by the wrapper module 112 of FIG. 1 in accordance with an embodiment of the present invention. Although specific steps are disclosed in flowchart 400, such steps are exemplary. That is, the wrapper module 112 is well suited to performing various other steps or variations of the steps recited in FIG. 4. It should be appreciated that the steps of flowchart 400 may be performed by software, by hardware or by any combination of software and hardware.

At step 402, the wrapper module 112 receives the implementation class of the desired distributed object from the extractor module 104. In step 404, the wrapper module 112 "wraps" the desired distributed object implementation in a "wrapper" to include the desired management instrumentation that is utilized in conjunction with compiled application 102. In this manner, the wrapper module 112 generates a wrapped distributed object (e.g., 114). It is appreciated that the wrapper provided by wrapper module 112 at step 404 may be implemented in diverse ways in accordance with the present embodiment.

For example, a wrapper generated at step 404 by the wrapper module 112 may include the desired instrumentation along with the ability to access the additional information passed to a server by clients for implementation of the instrumentation. The following code illustrates an exemplary Enterprise JavaBean wrapper that may be generated by the wrapper module 112 at step 404. It is understood that the Enterprise JavaBean wrapper code is provided as an example.

```
public class WrappedWeatherBean
implements SessionBean {
    Weather Bean aggregate=null;
    public WrappedWeatherBean( ) { aggregate=new WeatherBean( ); }
    public int hashCode( ) { return aggregate.hashCode( ); }
    public boolean equals(Object p0) { return aggregate.equals(p0); }
    public java.lang.String toString( ) { return aggregate.toString( );
} public void setSessionContext(javax.ejb.SessionContext p0) {
        aggregate.setSessionContext(p0);
    }
    public void ejbCreate( ) { aggregate.ejbCreate( ); }
    public void ejbRemove( ) { aggregate.ejbRemove( ); }
    public void ejbActivate( ) { aggregate.ejbActivate( ); }
    public void ejbPassivate( ) { aggregate.ejbPassivate( ); }
    public int getTemp(String p0) { return aggregate.getTemp(p0); }
    public int getTemp(Info info, String p0) {
        /*
         * report and process additional information
         * provided by client in info object
         */
        return aggregate.getTemp(p0);
    }
}
```

At step 406 of FIG. 4, the wrapper module 112 outputs the wrapped object implementation 114 that may subsequently be utilized to assist in measuring the performance of the distributed object of compiled software application 102. Additionally, at step 406, the wrapper module 112 outputs to a class name changer module (e.g., 118) the wrapper class name (e.g., 116) associated with the wrapped object implementation 114. At the completion of step 406, the wrapper module 112 exits flowchart 400.

Figure 5:
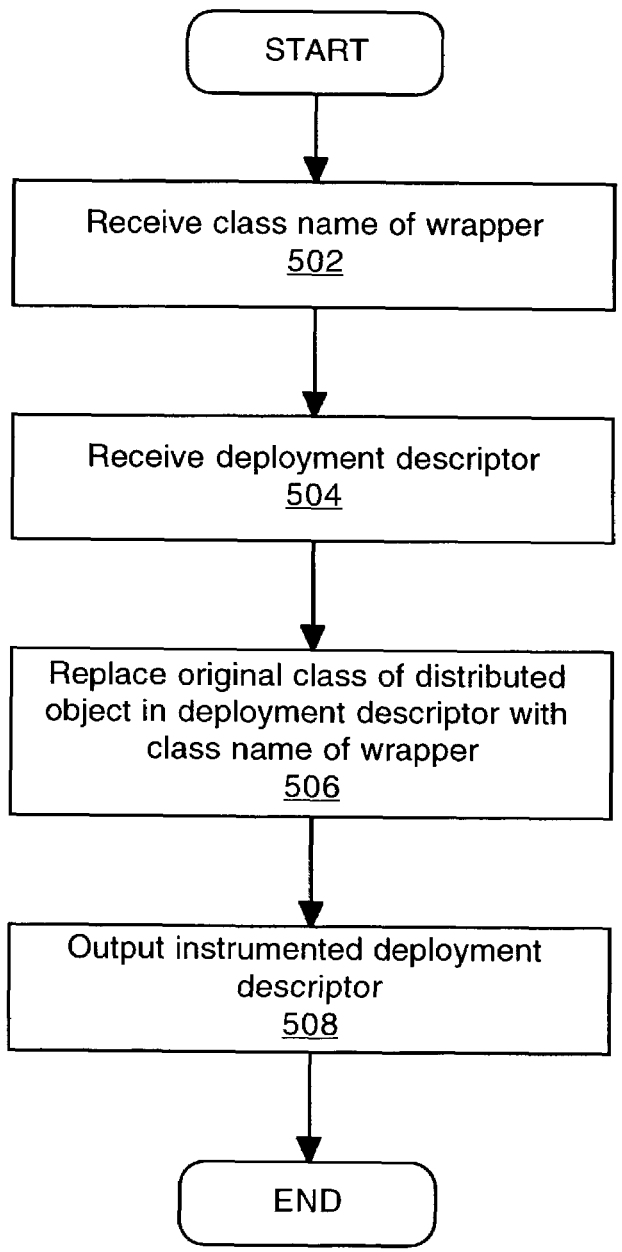
FIG. 5 is a flowchart of steps performed by the class name changer module of FIG. 1 in accordance with an embodiment of the present invention.

FIG. 5 is a flowchart 500 of steps performed by the class name changer module 118 of FIG. 1 in accordance with an embodiment of the present invention. Although specific steps are disclosed in flowchart 500, such steps are exemplary. That is, the class name changer module 118 is well suited to performing various other steps or variations of the steps recited in FIG. 5. It should be understood that the steps of flowchart 500 may be performed by software, by hardware or by any combination of software and hardware.

In step 502, the class name changer module 118 receives the wrapper class name 116 output by the wrapper module 112. At step 504, the class name changer module 118 receives the deployment descriptor associated with the desired distributed object from the compiled software application 102. It is understood that within the present embodiment, the class name changer module 118 is well suited to perform steps 502 and 504 in an order different than the order shown within FIG. 5.

In step 506 of FIG. 5, the class name changer module 118 replaces the original class name within the distributed object's deployment descriptor with the received wrapper class name 116. In this manner, the class name changer module 118 generates at step 506 an instrumented deployment descriptor (e.g., 120) associated with the instrumented distributed object. It is appreciated that step 506 may be performed by the class name changer module 118 in a wide variety of ways in accordance with the present embodiment. For example, within J2EE, the class name changer module 118 may replace the class name of an Enterprise JavaBean in its deployment descriptor with the wrapper class name 116 created by the wrapper module 112.

At step 508, the class name changer module 118 outputs the newly instrumented deployment descriptor 120 associated with the desired distributed object that may subsequently be utilized to assist in measuring the performance of the distributed object of compiled software application 102. At the completion of step 508, the class name changer module 118 exits flowchart 500.

It is noted that the automated dynamic interface adaptation system 100 of FIG. 1 may automatically perform flowcharts 200, 300, 400 and 500 for each distributed object of the compiled software application 102 that is a part of a specific transaction. In this manner, each of the distributed objects of a transaction of compiled application 102 may be instrumented for measuring the performance of each distributed object during the transaction that can be requested by one or more clients.

Figure 6:
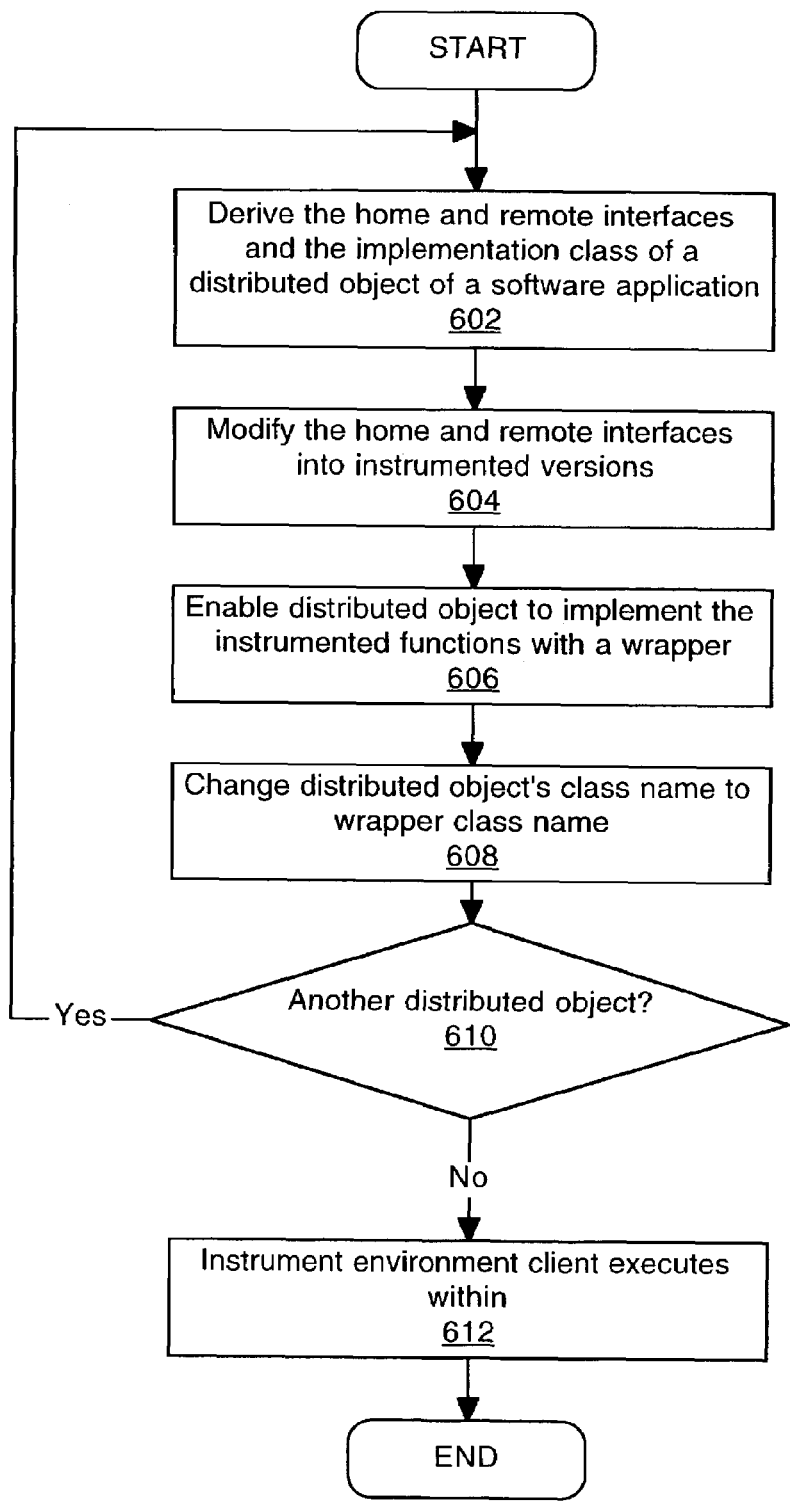
FIG. 6 is a flowchart of steps performed by a dynamic interface adapter in accordance with an embodiment of the present invention.

FIG. 6 is a flowchart 600 of steps performed by an automatic dynamic interface adapter in accordance with an embodiment of the present invention for instrumenting a compiled software application that includes distributed object technology. Although specific steps are disclosed in flowchart 600, such steps are exemplary. That is, the automatic dynamic interface adapter is well suited to performing various other steps or variations of the steps recited in FIG. 6. It should be appreciated that the steps of flowchart 600 may be performed by software, by hardware or by any combination of software and hardware.

At step 602, the automatic dynamic interface adapter derives the home interface, the remote interface, and the implementation class of a distributed object of a compiled software application. It is understood that the home interface, the remote interface, and the implementation class of the distributed object may be located in a wide variety of places within the compiled software application. For example, if the compiled software application is implemented utilizing J2EE, the automatic dynamic interface adapter at step 602 may derive the names of the home interface, the remote interface, and the name of the implementation class of the distributed object from a deployment descriptor associated with the distributed object. Based on this knowledge, the corresponding implementation classes may be obtained from the software application.

In step 604 of FIG. 6, the automatic dynamic interface adapter modifies the derived home interface and remote interface of the distributed object in order to produce instrumented versions of the home interface and remote interface. It is understood that the instrumented home and remote interfaces of the distributed object enables a client or other object to communicate with the distributed object once it includes an instrumented function(s) that measures the performance of the distributed object. The automatic dynamic interface adapter is well suited to modify the home and remote interfaces in diverse ways in order to generate an instrumented home interface and an instrumented remote interface. For example, the dynamic interface adapter may generate the instrumented home and remote interfaces in any manner similar to that described herein.

At step 606, the automatic dynamic interface adapter enables the distributed object to include the desired instrumented function(s). The inclusion of the desired instrumented function(s) with the distributed object may be performed by the dynamic interface adapter at step 606 in a wide variety of ways. For example, the dynamic interface adapter includes the desired instrumented function(s) with the distributed object at step 606 by wrapping the implementation of the distributed object with a "wrapper" in any manner similar to that described herein. The wrapper also enables the compiled software application to utilize the instrumented distributed object.

In step 608 of FIG. 6, the automatic dynamic interface adapter changes the class name within the distributed object's deployment descriptor to the class name of the wrapper associated with the distributed object. In this fashion, the dynamic interface adapter produces at step 608 an instrumented deployment descriptor (e.g., 120) associated with the instrumented distributed object. It is understood that step 608 may be implemented by the automatic dynamic interface adapter in any manner similar to that described herein.

At step 610, the automatic dynamic interface adapter determines whether there is another distributed object within the compiled software application that should be instrumented. If determined at step 610 that there is another distributed object within the compiled application that should be instrumented, the automatic dynamic interface adapter proceeds to the beginning of step 602. In this manner, the dynamic interface adapter is able to perform steps 602-608 for another distributed object of the compiled software application. However, if determined at step 610 that there is no more distributed objects within the compiled software application that should be instrumented, the automatic dynamic interface adapter proceeds to step 612.

In step 612 of FIG. 6, the automatic dynamic interface adapter instruments the environment one or more clients execute within. It is noted that the dynamic interface adapter at step 612 may instrument the environment that a client executes within in different ways. For example, within J2EE, the dynamic interface adapter may instrument the javax.rmi.PortableRemoteObject.narrow function to return an adapter that adapts each non instrumented Enterprise JavaBean function in the remote interface to its instrumented counterpart and may add the additional client information as shown in the following exemplary Home Reference Client Adapter code and exemplary Remote Reference Client Adapter code.

Exemplary Home Reference Client Adapter Code

```
public final class WeatherHomeAdapter
implements Instrumented, WeatherHome
{
    WeatherHome home;
    public WeatherHomeAdapter(WeatherHome home) {
        this.home=home;
    }
    public void remove(Object p0)
    throws java.rmi.RemoteException, javax.ejb.RemoveException {
        home.remove(p0);
    }
```

-continued

```
    public void remove(javax.ejb.Handle p0)
    throws java.rmi.RemoteException, javax.ejb.RemoveException {
        home.remove(p0);
    }
    public javax.ejb.EJBMetadata getEJBMetadata( )
    throws java.rmi.RemoteException {
        return home.getEJBMetadata( );
    }
    public javax.ejb.HomeHandle getHomeHandle( )
    throws java.rmi.RemoteException {
        return home.getHomeHandle( );
    }
    public Weather create( )
    throws java.rmi.RemoteException, javax.ejb.CreateException {
        return new WeatherAdapter(home.create( ));
    }
}
```

Exemplary Remote Reference Client Adapter Code

```
public final class WeatherAdapter
implements Instrumented, Weather
{
    Weather remote;
    public WeatherAdapter(Weather remote)
    { this.remote=remote; }
    public void remove( )
    throws java.rmi.RemoteException,
    javax.ejb.RemoveException {
        remote.remove( );
    }
    public javax.ejb.EJBHome getEJBHome( )
    throws java.rmi.RemoteException
    { return remote.getEJBHome( ); }
    public javax.ejb.Handle getHandle( )
    throws java.rmi.RemoteException
    { return remote.getHandle( ); }
    public Object getPrimaryKey( )
    throws java.rmi.RemoteException
    { return remote.getPrimaryKey( ); }
    public boolean isIdentical(javax.ejb.EJBObject p0)
    throws java.rmi.RemoteException
    { return remote.isIdentical(p0); }
    public int getTemp(String p0)
    throws java.rmi.RemoteException {
        /*
         * additional information is injected with new Info( ).
         */
        return remote.getTemp(new Info( ), p0);
    }
    public int getTemp(Info info, String p0)
    throws java.rmi.RemoteException {
        return remote.getAddress(info, p0);
    }
}
```

It is noted that the home reference client adapter and the remote home reference client adapter may be generated automatically by the automatic dynamic interface adapter at step 612. These adapters are then used by the client to communicate with the instrumented application. Since the client's source code might not be available, these adapters might be injected by a custom PortableRemoteObjectDelegate object. Such an object may be configured as part of the Java runtime environment and does not require any knowledge about the client code.

Alternatively, the automatic dynamic interface adapter at step 612 may instrument the environment that the client executes within in another way. For example, within J2EE, the lookup functions of the Enterprise JavaBean client-side support libraries may be instrumented by the automatic dynamic interface adapter at step 612 by returning an adapter in a manner similar to that previously described herein.

It is noted that there are some advantages of instrumenting the environment that the client executes in instead of changing the client program. For example, it does not require the availability of the client's implementation. Additionally, even if this source code were available, the execution environment is usually less likely to be changed by vendors and thus involves less maintenance. Furthermore, the execution environment typically has well defined interfaces that can be used for instrumentation. Moreover, the execution environment is usually well documented (which typically is not the case for the client program).

Figure 7:
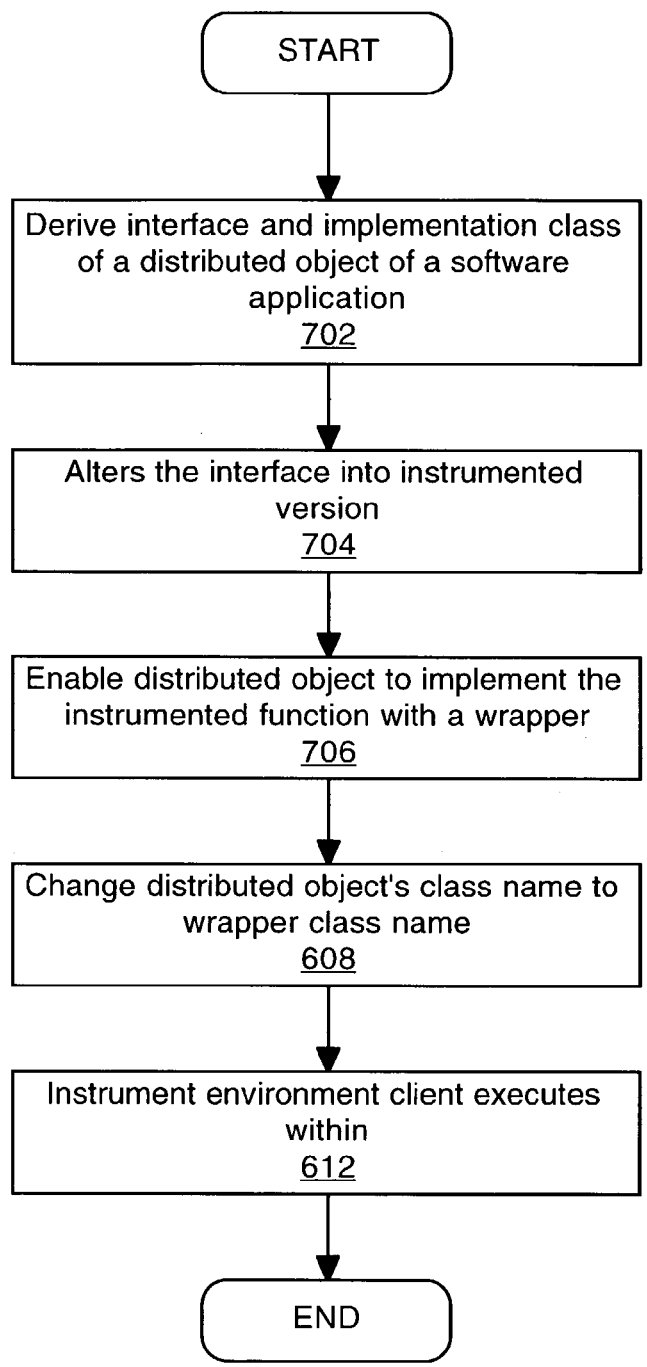
FIG. 7 is a flowchart of steps performed by a dynamic interface adapter in accordance with another embodiment of the present invention.

FIG. 7 is a flowchart 700 of steps performed by an automatic dynamic interface adapter in accordance with another embodiment of the present invention for instrumenting a compiled software application that includes distributed object technology. Although specific steps are disclosed in flowchart 700, such steps are exemplary. That is, the automatic dynamic interface adapter is well suited to performing various other steps or variations of the steps recited in FIG. 7. It should be understood that the steps of flowchart 700 may be performed by software, by hardware or by any combination of software and hardware.

In step 702, the automatic dynamic interface adapter derives an interface(s) and implementation class of a distributed object of the compiled software application. It is understood that the interface(s) and the implementation class of the distributed object may be located in diverse places within the compiled software application. For example, if the compiled software application is implemented utilizing J2EE, the automatic dynamic interface adapter at step 702 may derive the name of the interface(s), e.g., home interface and/or remote interface, and of the implementation class of the distributed object from a deployment descriptor associated with the distributed object and subsequently their implementation classes from the compiled software application 102.

At step 704 of FIG. 7, the automatic dynamic interface adapter alters the derived interface(s) of the distributed object in order to produce an instrumented version of the interface(s). The automatic dynamic interface adapter is well suited to modify the interface(s) in diverse ways in order to generate an instrumented interface(s) for the distributed object. For example, the dynamic interface adapter may generate the instrumented interface(s) in any manner similar to that described herein. It is understood that the instrumented interface(s) of the distributed object enables a client or other object to communicate with the distributed object once it includes an instrumented function(s) that measures the performance of the distributed object.

In step 706, the automatic dynamic interface adapter enables the distributed object to include the desired instrumented function or functions. The inclusion of the desired instrumented function(s) with the distributed object may be performed by the automatic dynamic interface adapter at step 706 in a wide variety of ways. For example, the dynamic interface adapter may include the desired instrumented function(s) with the distributed object at step 706 by wrapping the implementation of the distributed object with a wrapper in any manner similar to that described herein. The wrapper also enables the compiled software application to utilize the instrumented distributed object.

It is appreciated that steps 608 and 612 of FIG. 7 may be performed by the automatic dynamic interface adapter in a manner similar to that described herein with reference to steps 608 and 612 of FIG. 6.

Figure 8:
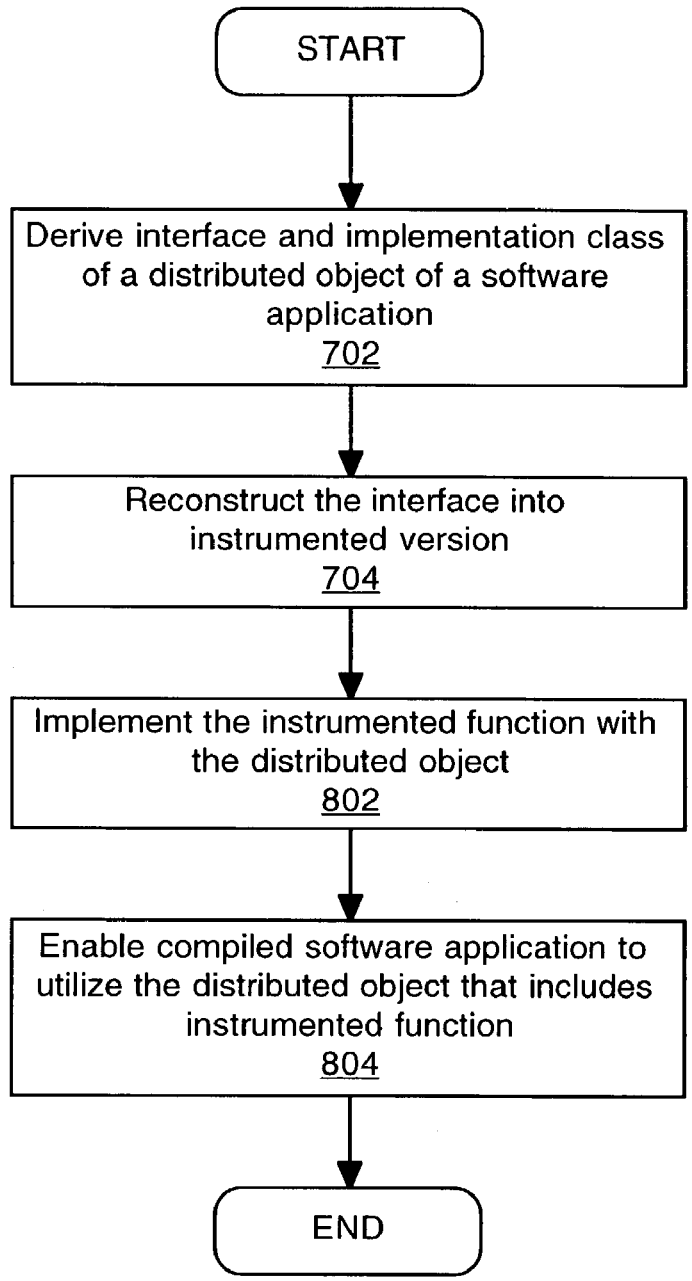
FIG. 8 is a flowchart of steps performed by a dynamic interface adapter in accordance with yet another embodiment of the present invention.

FIG. 8 is a flowchart 800 of steps performed by an automatic dynamic interface adapter in accordance with yet another embodiment of the present invention for instrumenting a compiled software application that includes distributed object technology. Although specific steps are disclosed in flowchart 800, such steps are exemplary. That is, the automatic dynamic interface adapter is well suited to performing various other steps or variations of the steps recited in FIG. 8. It should be understood that the steps of flowchart 800 may be performed by software, by hardware or by any combination of software and hardware.

It is appreciated that steps 702 and 704 of FIG. 8 may be performed by the automatic dynamic interface adapter in a manner similar to that described herein with reference to steps 702 and 704 of FIG. 7. At step 802 of FIG. 8, the automatic dynamic interface adapter implements the instrumented function(s) with the desired object of the compiled software application. In this manner, the object is able to include the instrumented function(s) that measures the performance of the object during a transaction of the compiled software application. The dynamic interface adapter may include or implement the instrumented function(s) with the object at step 802 in any manner similar to that described herein.

In step 804 of FIG. 8, the automatic dynamic interface adapter enables the compiled software application to utilize the object that includes the instrumented function(s). The automatic dynamic interface adapter may perform step 804 in diverse ways in accordance with the present embodiment. For example, the automatic dynamic interface adapter at step 804 may change the class name within the object's deployment descriptor to the class name of a wrapper associated with the instrumented object in a manner similar to that described herein with reference to step 608 of FIG. 6. It is understood that step 804 may be implemented by the automatic dynamic interface adapter in any manner similar to that described herein.

FIG. 9 is a block diagram of an exemplary network 900 that may be utilized in accordance with an embodiment of the present invention. Within networking environment 900, client programs (e.g., web browsers) may operate on client devices 902 and 904 which are able to communicate with one or more software applications operating on server 908 via network 906. Specifically, network 900 includes server 908 and client devices 902 and 904 which are each communicatively coupled to network 906. It is appreciated that server 908 and clients 902 and 904 may be communicatively coupled to network 906 via wired and/or wireless communication technologies. The network 906 may be implemented in a wide variety of ways in accordance with the present embodiment. For example, network 906 may be implemented as, but not limited to, a local area network (LAN), a wide area network (WAN) and/or the Internet.

It is noted that networking environment 900 is well suited to be implemented without network 906. As such, clients 902 and 904 may be communicatively coupled to server 908 via wired and/or wireless communication technologies. Furthermore, networking environment 900 may be implemented to include more or less client devices than the two client devices (e.g., 902 and 904) shown in FIG. 9. Additionally, networking environment 900 may be implemented to include more server devices than the one server device (e.g., 908) shown.

Accordingly, the present invention provides a way to more accurately measure the amount of time spent by a distributed object during a transaction when the source code of a software application is not available. Furthermore, the present invention also provides a way which satisfies the above accomplishment and can be implemented even if the client/server protocol for exchanging messages is not well understood.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for instrumenting a compiled software application that includes distributed object technology, said method comprising:

deriving an interface and an implementation class of at least one object utilized by said compiled software application;

providing an instrumented interface of said at least one object to include a communication functionality, said communication functionality enabling a client to communicate with said object;

providing an instrumented implementation of said object to include a performance measuring instrumented function with said at least one object, said performance measuring instrumented function utilized to measure a performance aspect of said at least one object;

utilizing said instrumented interface and said instrumented implementation to form at least one instrumented object; and redirecting said compiled software application to utilize said at least one instrumented object instead of said at least one object, wherein said redirecting is performed by instrumenting an environment said client operated within.

2. The method as described in claim 1 wherein said instrumented function measures the amount of time spent by said object during a transaction of said compiled software application.

3. The method as described in claim 1 wherein said interface is a home interface or a remote interface.

4. The method as described in claim 1 wherein said forming said at least one instrumented object includes wrapping said instrumented interface and said instrumented implementation of said at least one object in a wrapper.

5. The method as described in claim 1 wherein said redirecting a call to said at least one object from said compiled software application to said at least one instrumented object includes changing a class name within a deployment descriptor associated with said at least one object.

6. The method as described in claim 1 wherein said client includes a software application.

7. The method as described in claim 1 wherein said distributed object technology includes a .NET programming language or a Java™ programming language.

8. A computer-implemented automated dynamic interface adaptation system for implementing instrumentation within a compiled software application that includes distributed object technology, said system comprising:
 a memory;
 an extractor module that derives an interface and an implementation class of at least one object utilized by said compiled software application;
 a modifier module that modifies said interface of said at least one object to include a communication functionality, said communication functionality enabling a client to communicate with said at least one object;
 a wrapper module that utilizes a wrapper to wrap an instrumented function with said at least one object to form at least one wrapped object, said instrumented function including a performance measuring functionality enabling said instrumented function to measure a performance aspect of said at least one object; and
 a class name changer module that replaces a class name of said at least one object within the at least one object's deployment descriptor to a class name of said at least one wrapped object, such that a call to said at least one object is redirected to said at least one wrapped object, wherein said redirect is performed by an environment module that instruments an environment said client executes within.

9. The system of claim 8 wherein said instrumented function measures the amount of time spent by said object during a transaction of said compiled software application.

10. The system of claim 8 wherein said interface is a home interface or a remote interface.

11. The system of claim 8 wherein said class name changer module changes said class name of said at least one object within a deployment descriptor of said compiled software application to a class name associated with said at least one wrapped object.

12. The system of claim 8 wherein said client includes a software application.

13. The system of claim 8 wherein said distributed object technology includes a .NET programming language or a Java programming language.

14. A system for instrumenting a compiled software application that includes distributed object technology, said system comprising:
 a memory;
 means for acquiring an interface and an implementation class of at least one distributed object utilized by said compiled software application;
 means for modifying said interface to generate an instrumented interface of said at least one distributed object to include a communication functionality, said communication functionality enabling a client to communicate with said at least one distributed object;
 means for providing an instrumented implementation class of said distributed object to include a performance measuring functionality with said at least one distributed object, said performance measuring functionality enabling an instrumented function to measure a performance aspect of said at least one distributed object;
 means for forming at least one instrumented distributed object comprising said instrumented interface and said instrumented implementation; and
 means for capacitating said compiled software application to use said instrumented distributed object that includes said instrumented function instead of said distributed object, wherein said capacitating means is performed by an environment module that instruments an environment said client executes within.

15. The system as described in claim 14 wherein said instrumented function measures the amount of time spent by said at least one distributed object during a transaction of said compiled software application.

16. The system as described in claim 14 wherein said interface is a home interface or a remote interface.

17. The system as described in claim 14 wherein said client includes a software application.

18. The system of claim 14 wherein said means for capacitating said compiled software application to use said at least one instrumented distributed object includes changing a class name within a deployment descriptor associated with said distributed object.

19. The system of claim 14 wherein said means for providing said at least one instrumented distributed object includes wrapping said instrumented interface and said instrumented implementation of said at least one distributed object in a wrapper.

20. The system of claim 14 wherein said distributed object technology includes a .NET programming language or a Java programming language.

* * * * *

UNITED STATES PATENT AND TRADEMARK OFFICE
CERTIFICATE OF CORRECTION

| | |
|---|---|
| PATENT NO. | : 7,287,247 B2 |
| APPLICATION NO. | : 10/293626 |
| DATED | : October 23, 2007 |
| INVENTOR(S) | : Thomas Gschwind et al. |

It is certified that error appears in the above-identified patent and that said Letters Patent is hereby corrected as shown below:

On the title page, item (75), under "Inventors", in column 1, line 1, delete "Vienna" and insert -- Wien --, therefor.

Signed and Sealed this

Fifteenth Day of July, 2008

JON W. DUDAS
*Director of the United States Patent and Trademark Office*